US012367534B2

(12) United States Patent
Kosanam et al.

(10) Patent No.: US 12,367,534 B2
(45) Date of Patent: Jul. 22, 2025

(54) METHOD TO OPERATE THE DEVICES FOR REAL ESTATE SHOWINGS

(71) Applicant: Carrier Corporation, Palm Beach Gardens, FL (US)

(72) Inventors: Sri Sivanagaraju Kosanam, Telangana (IN); Vidyasagar Reddy Pentareddy, Telangana (IN); Ramesh Lingala, Telangana (IN); Adam Kuenzi, Silverton, OR (US); Matthew S. Hill, Sublimity, OR (US); Dean Sinn, Silverton, OR (US); Victor Nguyen, Vancouver, WA (US); Subhash Reddy Gopavaram, Telangana (IN)

(73) Assignee: HONEYWELL INTERNATIONAL INC., Charoltte, NC (US)

( * ) Notice: Subject to any disclaimer, the term of this patent is extended or adjusted under 35 U.S.C. 154(b) by 234 days.

(21) Appl. No.: 18/149,417

(22) Filed: Jan. 3, 2023

(65) Prior Publication Data

US 2023/0214948 A1 Jul. 6, 2023

Related U.S. Application Data

(60) Provisional application No. 63/296,460, filed on Jan. 4, 2022.

(51) Int. Cl.
| G06Q 50/16 | (2024.01) |
| G06Q 30/02 | (2023.01) |
| G06Q 30/06 | (2023.01) |
| G06Q 40/02 | (2023.01) |
| G06Q 50/163 | (2024.01) |

(52) U.S. Cl.
CPC .................. *G06Q 50/163* (2013.01)

(58) Field of Classification Search
CPC .............. G06Q 50/163; G06Q 50/16
USPC ............... 705/1.1–912, 313, 314
See application file for complete search history.

(56) References Cited

U.S. PATENT DOCUMENTS

| 7,606,558 | B2 | 10/2009 | Despain et al. |
| 8,035,480 | B2 | 10/2011 | Woodard et al. |
| 9,460,480 | B2 | 10/2016 | Woodard et al. |
| 9,836,897 | B2 * | 12/2017 | Briskey ............... G07C 9/257 |
| 9,852,562 | B2 * | 12/2017 | Belhadia ............... H04W 4/80 |
| 9,858,739 | B1 | 1/2018 | Johnson et al. |
| 9,881,347 | B2 | 1/2018 | Schmidt-Lackner et al. |
| 9,916,742 | B2 | 3/2018 | Kuenzi |
| 9,934,635 | B2 | 4/2018 | Turner et al. |
| 10,347,063 | B1 | 7/2019 | Larovere et al. |
| 10,885,596 | B1 | 1/2021 | Woodard et al. |
| 10,977,583 | B2 | 4/2021 | Camargo et al. |
| 11,122,041 | B2 | 9/2021 | Hafernik |
| 11,145,016 | B1 | 10/2021 | Brophy |

(Continued)

*Primary Examiner* — Jonathan P Ouellette
(74) *Attorney, Agent, or Firm* — CANTOR COLBURN LLP (57) ABSTRACT

A method of staging a listed property for a real-estate showing including: receiving authorization information to access and control one or more internet of things (IoT) connected devices at the listed property from a first person via a first computer application accessed through a seller computing device; receiving showing settings and timing settings for each of the one or more IoT connected devices; and adjusting each of one or more IoT connected devices for the real-estate showing in accordance with the showing settings and the timing settings.

15 Claims, 4 Drawing Sheets

(56) References Cited

U.S. PATENT DOCUMENTS

| | | | |
|---|---|---|---|
| 11,570,016 B2* | 1/2023 | Johnson | G06F 3/017 |
| 11,676,225 B1* | 6/2023 | Catalano | G06Q 50/16 |
| | | | 705/313 |
| 2006/0106628 A1 | 5/2006 | Faherty et al. | |
| 2013/0297075 A1 | 11/2013 | Land, III | |
| 2014/0006083 A1 | 1/2014 | Bengson et al. | |
| 2017/0372542 A1* | 12/2017 | Romero | G06V 40/172 |
| 2019/0156444 A1* | 5/2019 | Targownik | G06Q 50/163 |
| 2021/0407023 A1* | 12/2021 | Brophy | G07C 9/27 |

* cited by examiner

METHOD TO OPERATE THE DEVICES FOR REAL ESTATE SHOWINGS

CROSS-REFERENCE TO RELATED APPLICATIONS

This application claims the benefit of U.S. Provisional Application No. 63/296,460 filed Jan. 4, 2022, all of which are incorporated herein by reference in their entirety.

BACKGROUND

The embodiments herein generally relate to real-estate showing scheduling and more specifically, a method and apparatus to operate devices for real estate showings.

Real estate showings often require licensed realtors to arrive early and stay late to ensure that the house is staged properly for the showing.

BRIEF DESCRIPTION

According to one embodiment, a method of staging a listed property for a real-estate showing is provided. The method including: receiving authorization information to access and control one or more internet of things (IoT) connected devices at the listed property from a first person via a first computer application accessed through a seller computing device; receiving showing settings and timing settings for each of the one or more IoT connected devices; and adjusting each of one or more IoT connected devices for the real-estate showing in accordance with the showing settings and the timing settings.

In addition to one or more of the features described above, or as an alternative, further embodiments of may include detecting a location of a showing computing device that is in possession of a second person assigned to show the listed property to a potential buyer; and determining an arrival time of the second person at the listed property, wherein at least one of the one or more IoT devices is adjusted before the arrival time.

In addition to one or more of the features described above, or as an alternative, further embodiments of may include determining when the real-estate showing has ended; and readjusting each of one or more the one or more IoT connected devices in accordance with the showing settings and the timing settings when the real-estate showing has ended.

In addition to one or more of the features described above, or as an alternative, further embodiments of may include locking a smart lock at the listed property for a duration of the real-estate showing.

In addition to one or more of the features described above, or as an alternative, further embodiments of may include unlocking a smart lock at the listed property when the real-estate showing has ended.

In addition to one or more of the features described above, or as an alternative, further embodiments of may include receiving a note for the showing computing device from a smart lock indicating why the smart lock is locked.

In addition to one or more of the features described above, or as an alternative, further embodiments of may include that it is determined that the real-estate showing has ended by: detecting when a lockbox has been closed.

In addition to one or more of the features described above, or as an alternative, further embodiments of may include that it is determined that the real-estate showing has ended by: detecting a location of a showing computing device that is in possession of a second person assigned to show the listed property to a potential buyer; and detecting when the location of the showing computing device is outside of a selected radius of the listed property.

In addition to one or more of the features described above, or as an alternative, further embodiments of may include detecting a location of a showing computing device that is in possession of a second person assigned to show the listed property to a potential buyer, wherein at least one of the one or more IoT connected devices adjusts based on the location of the showing computing device at the listed property.

In addition to one or more of the features described above, or as an alternative, further embodiments of may include turning on a smart light at the listed property for the real-estate showing prior to a start time of the real-estate showing.

In addition to one or more of the features described above, or as an alternative, further embodiments of may include determining when the real-estate showing has ended; and shutting off the smart light when the real-estate showing has ended.

In addition to one or more of the features described above, or as an alternative, further embodiments of may include activating an air refresher at the listed property for the real-estate showing prior to a start time of the real-estate showing.

In addition to one or more of the features described above, or as an alternative, further embodiments of may include determining when the real-estate showing has ended; and shutting off the air refresher when the real-estate showing has ended.

In addition to one or more of the features described above, or as an alternative, further embodiments of may include activating a heating, ventilation, and air conditioning (HVAC) system at the listed property for the real-estate showing prior to a start time of the real-estate showing.

In addition to one or more of the features described above, or as an alternative, further embodiments of may include determining when the real-estate showing has ended; and adjusting the HVAC system for energy savings when the real-estate showing has ended.

According to another embodiment, a computer program product tangibly embodied on a non-transitory computer readable medium is provided. The computer program product including instructions that, when executed by a processor, cause the processor to perform operations including: receiving authorization information to access and control one or more Internet of things (IoT) connected devices at the listed property from a first person via a first computer application accessed through a seller computing device; receiving showing settings and timing settings for each of the one or more IoT connected devices; and adjusting each of one or more IoT connected devices for the real-estate showing in accordance with the showing settings and the timing settings.

In addition to one or more of the features described above, or as an alternative, further embodiments of may include the operations further includes: detecting a location of a showing computing device that is in possession of a second person assigned to show the listed property to a potential buyer; and determining an arrival time of the second person at the listed property, wherein at least one of the one or more IoT devices is adjusted before the arrival time.

In addition to one or more of the features described above, or as an alternative, further embodiments of may include the operations further includes: determining when the real-estate showing has ended; and readjusting each of one or more the one or more IoT connected devices for in accordance with the showing settings and the timing settings when the real-estate showing has ended.

In addition to one or more of the features described above, or as an alternative, further embodiments of may include the operations further includes: locking a smart lock at the listed property for a duration of the real-estate showing.

In addition to one or more of the features described above, or as an alternative, further embodiments of may include the operations further includes: unlocking a smart lock at the listed property when the real-estate showing has ended.

Technical effects of embodiments of the present disclosure include an automated system to activate devices in the house to prep the house for showings prior to the real-estate agent arriving and then automatically deactivating the devices upon the realtor leaving.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Real estate showings often require licensed realtors to arrive early and stay late to ensure that the house is staged properly for the showing. This is conventionally a manual effort with realtors being required to turn on lights in the house, set thermostats properly, and perform other manual tasks to ensure that the house looks as best as possible. Following the showing, the opposite process occurs, and the realtor shuts off all the lights, re-adjusts the thermostats, locks the doors, and performs other manual tasks to properly close the house up. The embodiments disclosed herein seek to utilize internet of things (IoT) connected devices to help reduce the manual effort that is involved in real-estate showings by activating or adjusting IoT devices for the real-estate showings then deactivating or readjusting IoT devices following the showing.

Figure 1:
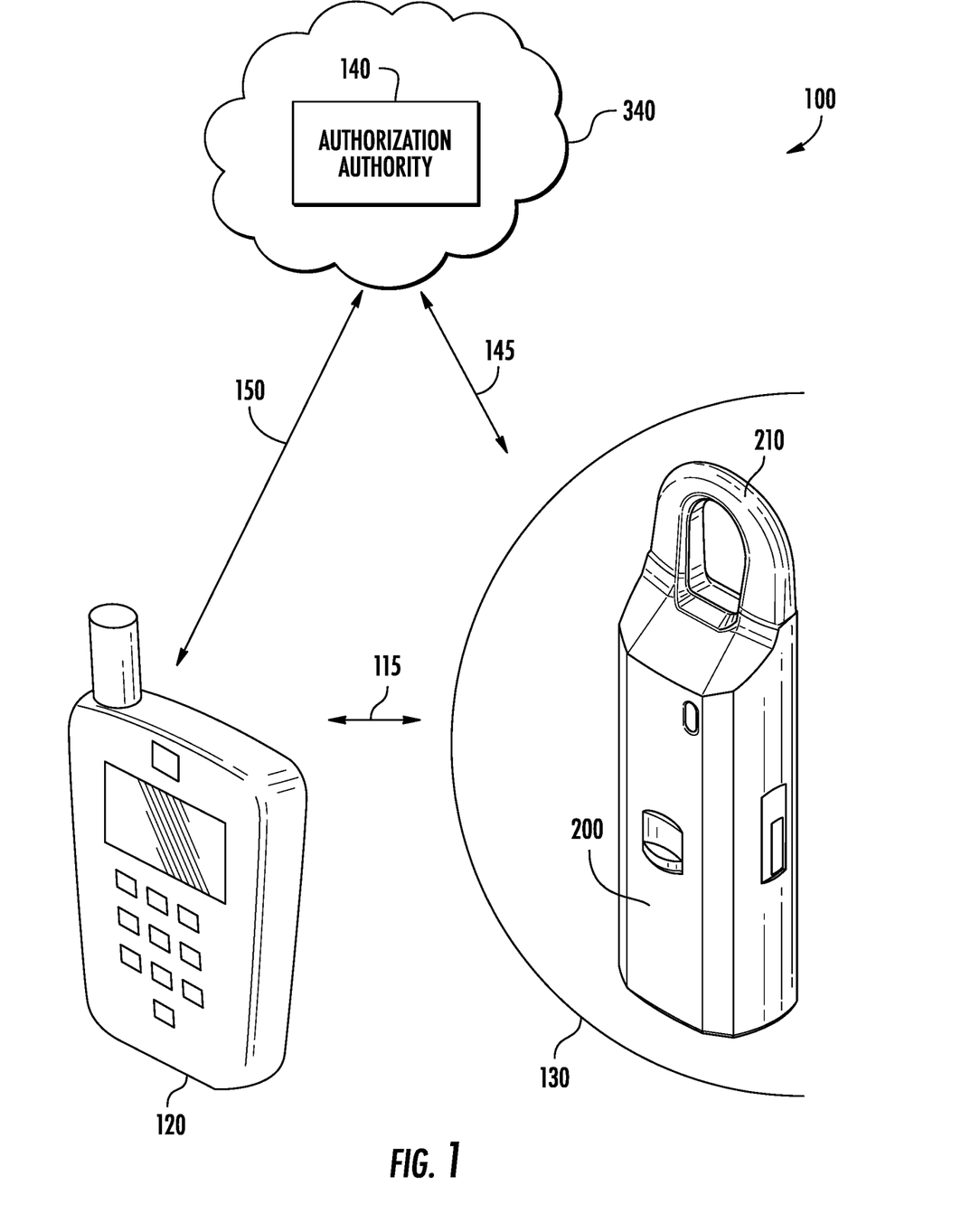
FIG. 1 is a schematic illustration of a lockbox and access device, which also shows a remote authorization entity that may be linked to the lockbox and/or the access device, according to an embodiment of the present disclosure.
Figure 2:
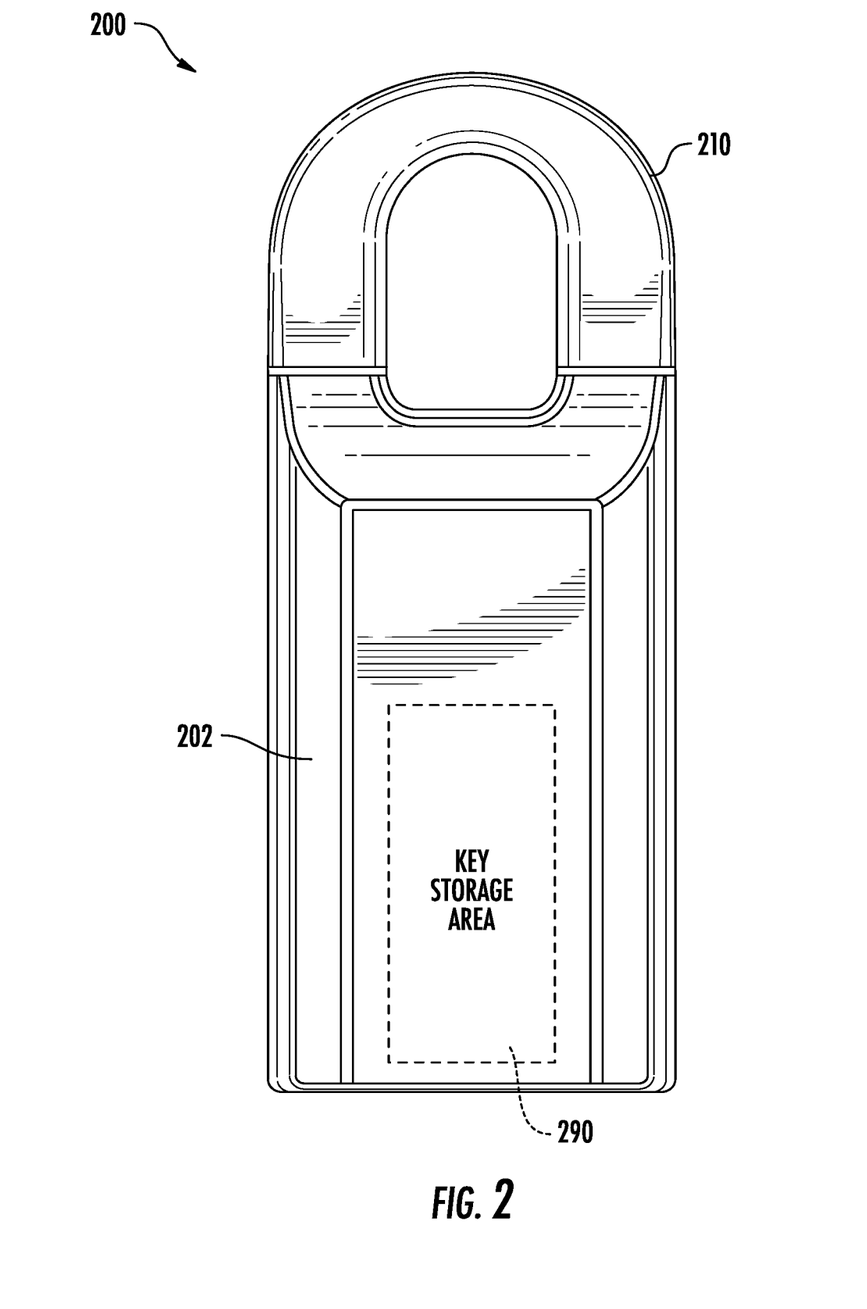
FIG. 2 is a schematic view of a lockbox showing a storage area suitable for holding one or more keys, access cards, or other access aids, according to an embodiment of the present disclosure.

Referring now to FIGS. 1 and 2, a schematic view of a representative restricted range lockbox and access key system 100 is illustrated, in accordance with embodiments of the present disclosure. A lockbox 200 with wireless communications capability is shown in relation to an access device, which in this example is a cellular telephone 120. The restricted range of the lockbox is shown schematically at 130. Thus, the cellular telephone as shown in FIG. 1 is outside of the lockbox's operating range 130, and would need to be moved within the range 130 to communicate with the lockbox 200. It is understood that while a cellular telephone 120 is illustrated as a device for transmitting an access request to the lockbox 200, that the embodiments disclosed herein are also applicable to any other electronic access device that can be capable of connecting to the lock box 200 over radio-frequency identification (RFID), Bluetooth, Ultra-wide band (UWB), or any similar wireless technology. In one example, the cellular telephone 120 may be replaced by an RFID card.

Communications between the lockbox 200 and the cellular telephone 120 may be two-way, as indicated by the two-way arrow representing a communications link 115. The communications link 115 may be infrared, Bluetooth, Low-Energy Bluetooth, Near Field Communication (NFC), UWB, or any other similar communication method known to one of skill in the art. In some cases, one-way communication from the cellular telephone 120 to the lockbox 200 may be sufficient.

All of the conventional lockbox functions are supported. Thus, the communications from the cellular telephone 120 to the lockbox 200 would include the ability for the user of the cellular telephone 120 to make an access request directed to the lockbox 200. This access request would include communication of a credential indicating that the user is authorized for access.

In response, the lockbox 200 may communicate a message, either via a display on the lockbox 200, via an LED screen on the lockbox 200 via a message transmitted to the cellular telephone 120, or via an audible sound emitted from a speaker attached to the lockbox 200 or near the lockbox 200, denying access. Access may be denied, e.g., if the user is unauthorized, if the user's credentials have expired, or if the access privileges have been superseded (i.e., if the property owner has overridden access privileges or is invoking the call before showing feature).

If access is granted, the lockbox 200 allows the user to gain access to a key storage area 290 (FIG. 2) in the lockbox 200 or open a shackle 210 for removing the lockbox 200 from an object to which it is attached (e.g., a door). In specific implementations, the lockbox has a circuit that controls a lock mechanism that secures the key storage area 290 and shackle 210 in a locked condition when in use. When an access request is granted, the circuit unlocks the lock mechanism to provide the user access to the storage area 290, the shackle, or both. The internal components of the lockbox 200 and the key storage area 290 are protected from the external environment by an outer cover 202. The outer cover 202 may be composed of a tough durable material to prevent someone from breaking into the lockbox 200 and removing the key or the access card in the key storage area 290.

The lockbox 200 functions with power received from a battery or a backup battery in the lockbox 200. The cellular telephone 120 may be any cellular telephone having restricted range wireless communications capability or other equivalent access device.

Optionally, the access key system 100 may also include an authorization authority 140, which can be linked to the lockbox 200 (via a link 145), or to the cellular telephone 120 (via the link 150) or to both the lockbox 200 and the cellular telephone 120. The authorization authority 140 may be located in a real-estate showings cloud database 340. The authorization authority 140 can administer granting credentials to users, collect information on usage and activity and provide for updates to devices (lockboxes and access devices) in the access key system 100. The lockbox 200 may be connected to the real-estate showings cloud database 340 through link 145, which may be a cellular connection, a satellite connection, or a local Wi-Fi connection, such as, for example the Wi-Fi of the house where the lockbox 200 has been placed.

There are a number of possible ways to implement restricted range wireless communications by which the communicating devices are magnetically coupled. As only one example, the devices can be configured according to the Near Field Communication standards.

NFC is described as a standards based, short range wireless connectivity technology that enables simple and safe two-way interactions among appropriately configured electronic devices. Near Field Communication is based on inductive-coupling, where loosely coupled inductive circuits share power and data over a distance of a few centimeters. NFC devices share some similarities with proximity (13.56 MHz) RFID tags and contactless smartcards, but have a number of new features.

NFC is described as being fast, private, and easy as compared to other wireless standards. The NFC set-up time is less than 0.1 millisecond, which is much less than the Bluetooth set-up time of about 6 seconds and less than the IrDa set-up time of about 0.5 second. The NFC operating range is 10 cm or less, which is shorter and provides for more privacy than RFID (operating range up to 3 meters) and Bluetooth (up to 30 meters). At the same time, NFC is more convenient than IrDa which requires line of sight alignment for communication between devices, whereas NFC requires only that the devices be within the NFC operating range of each other. Thus, NFC is one communications technology ideally suited to implementing a restricted range lockbox. In addition, RFID is largely limited to item tracking, and Bluetooth is comparatively more difficult to use because some configuration of the device is required.

NFC operates at 13.56 MHz and transfers data at up to 424 Kbits/second (current data rates are 106 kbps, 212 kbps and 424 kbps). The 13.56 MHz band is not currently regulated, so no license is required. NFC is both a "read" and "write" technology. NFC devices are unique in that they can change their mode of operation to be in reader/writer mode, peer-to-peer mode, or card emulation mode. In reader/writer mode, an NFC device is capable of reading NFC tag types, such as in the scenario of reading an NFC Smartposter tag. The reader/writer mode is on the RF interface compliant with the ISO 14443 and FeliCa schemes. In Peer-to-Peer mode, two NFC devices can exchange data. For example, Bluetooth or Wi-Fi link set up parameters can be shared, and/or data such as virtual business cards or digital photos can be exchanged. Peer-to-Peer mode is standardized on the ISO/IEC 18092 standard. In Card Emulation mode, the NFC device itself acts as an NFC tag (which is a passive device that stores data), appearing to an external reader much the same as a traditional contactless smart card. This enables, for example, contactless payments and eticketing.

Communication between two NFC-compatible devices occurs when they are brought within operating range of each other: a simple wave or touch of a device can establish an NFC connection, which is then compatible with other known wireless technologies such as Bluetooth or Wi-Fi. Because the transmission range is so short, NFC-enabled transactions are inherently secure. Also, the required physical proximity of one device to another is intuitive and gives users the reassurance of being in control of the process.

The underlying layers of NFC technology follow ISO/IEC (International Organization for Standardization/International Electrotechnical Commission, ECMA (European Telecommunications Standards Institute), and ETSI (European Telecommunications Standards Institute) standards. NFC compliant devices in the NFC Reader/Writer mode must support the RF requirements for ISO/IEC 14443A, ISO/IEC 14443 B and FeliCa as outlined in the relevant parts in the ISO 18092. As of this time, there are five published NFC specifications: Smart Poster Record Type Definition (RTD); Data Exchange Format; Record Type Definition; Text RTD and URI RTD. NFC devices are naturally interoperable, as NFC is based on pre-existing contactless payment and ticketing standards that are used on a daily basis by millions of people and devices worldwide. These standards determine not only the "contactless" operating environment, such as the physical requirements of the antennas, but also the format of the data to be transferred and the data rates for that transfer.

Because NFC components are generally smaller, the size of the access device can be kept small, which increases convenience. Also, the size of the lockbox can be reduced.

It is understood that embodiments described herein are not limited to the communication link 115 between the lockbox 200 and the cellular telephone 120 being NFC, and the embodiment described herein may be applicable to other communications links 115 between the lockbox 200 and the cellular telephone 120 including but not limitation to infrared, Bluetooth, Low-Energy Bluetooth, or any other similar communication method known to one of skill in the art.

Figure 3:
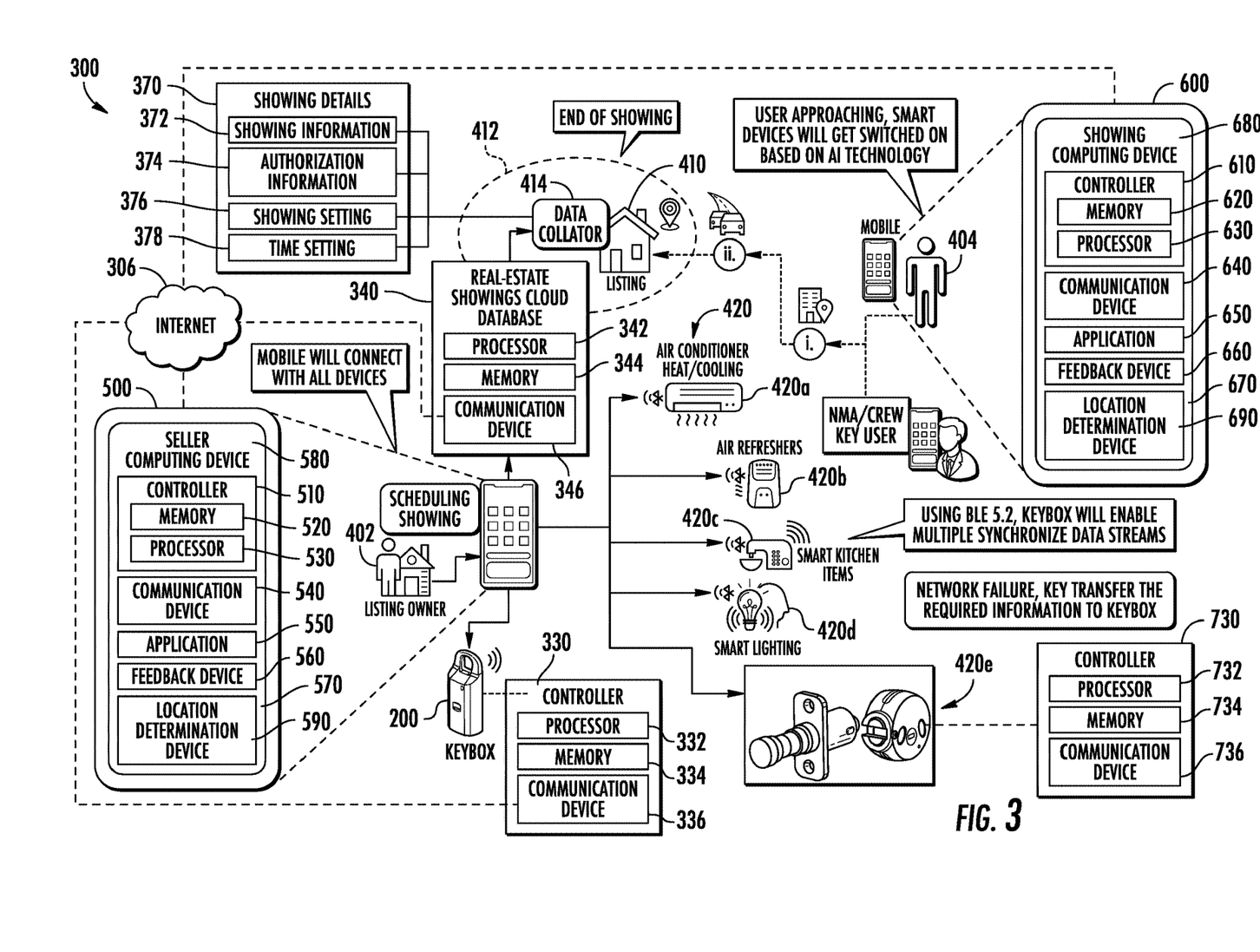
FIG. 3 is a schematic diagram of a real-estate showing assistance system, according to an embodiment of the present disclosure.

Referring now to FIG. 3, a schematic diagram of a real-estate showing assistance system 300 is illustrated, according to an embodiment of the present disclosure. It should be appreciated that, although particular systems are separately defined in the schematic block diagrams, each or any of the systems may be otherwise combined or separated via hardware and/or software.

The real-estate showing assistance system 300 includes the real-estate showings cloud database 340, the lockbox 200, a first computer application 550 installed or accessible on a seller computing device 500, and a second computer application 650 installed or accessible on a showing computing device 600. It is understood that the first computer application 550 and the second computer application 650 may be the same mobile application but just installed on two different devices 500, 600 and/or accessible from the two different devices 500, 600. The first computer application 550 and the second computer application 650 may be accessible from two different devices 500, 600, such as, for example, a software-as-as service or a website. The first computer application 550 and the second computer application 650 may be in communication with the cloud database via the internet 306.

The lockbox 200 includes a controller 330 that is configured to communicate with the first application 550, the second application 650, and the real-estate showings cloud database 340. The controller 330 may be an electronic controller including a processor 332 and an associated memory 334 comprising computer-executable instructions (i.e., computer program product) that, when executed by the processor 332, cause the processor 332 to perform various operations. The processor 332 may be, but is not limited to, a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory 334 may be but is not limited to a random access memory (RAM), read only memory (ROM), or other electronic, optical, magnetic or any other computer readable medium.

The controller 330 also includes a communication device 336. The communication device 336 may be capable of wireless communication including but not limited to Wi-Fi, Bluetooth, Zigbee, Sub-GHz RF Channel, cellular, satellite, LoRa, UWB, or any other wireless signal known to one of skill in the art. The communication device 336 may be configured to communicate with the real-estate showings cloud database 340 through the internet 306. Alternatively, or additionally, the communication device 336 may be configured to communicate directly with the real-estate showings cloud database 340.

The real-estate showings cloud database 340 may be a remote computer server that includes a processor 342 and an associated memory 344 comprising computer-executable instructions (i.e., computer program product) that, when executed by the processor 342, cause the processor 342 to perform various operations. The processor 342 may be, but is not limited to, a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory 344 may be but is not limited to a random access memory (RAM), read only memory (ROM), or other electronic, optical, magnetic or any other computer readable medium.

The real-estate showings cloud database 340 also includes a communication device 346. The communication device 346 may be capable of communication with the internet. The communication device 346 may be configured to communicate with the seller computing device 500 and the showing computing device 600 through the internet 306. The communication device 346 may be a software module that handles communications to and from the computer applications 550, 650.

The seller computing device 500 may be a desktop computer, a laptop computer, or a mobile computing device that is typically carried by a person, such as, for example a phone, a smart phone, a PDA, a smart watch, a tablet, a laptop, or any other mobile computing device known to one of skill in the art.

The seller computing device 500 includes a controller 510 configured to control operations of the seller computing device 500. The controller 510 may be an electronic controller including a processor 530 and an associated memory 520 comprising computer-executable instructions (i.e., computer program product) that, when executed by the processor 530, cause the processor 530 to perform various operations. The processor 530 may be, but is not limited to, a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory 520 may be but is not limited to a random access memory (RAM), read only memory (ROM), or other electronic, optical, magnetic or any other computer readable medium.

The seller computing device 500 includes a communication device 540 configured to communicate with the internet 306 through one or more wireless signals. The one or more wireless signals may include Wi-Fi, Bluetooth, Zigbee, Sub-GHz RF Channel, cellular, satellite, or any other wireless signal known to one of skill in the art. Alternatively, the seller computing device 500 may be connected to the internet 306 through a hardwired connection. The seller computing device 500 is configured to communicate with the real-estate showings cloud database 340 through the internet The seller computing device 500 may include a display device 580, such as for example a computer display, an LCD display, an LED display, an OLED display, a touchscreen of a smart phone, tablet, or any other similar display device known to one of the skill in the art. A user operating the seller computing device 500 is able to view the first computer application 550 through the display device 580.

The seller computing device 500 includes an input device 570 configured to receive a manual input from a user (e.g., human being) of computing device 500. The input device 570 may be a keyboard, a touch screen, a joystick, a knob, a touchpad, one or more physical buttons, a microphone configured to receive a voice command, a camera or sensor configured to receive a gesture command, an inertial measurement unit configured to detect a shake of the seller computing device 500, or any similar input device known to one of skill in the art. The user operating the seller computing device 500 is able to enter data into the first computer application 550 through the input device 570. The input device 570 allows the user operating the seller computing device 500 to data into the first computer application 550 via a manual input to input device 570. For example, the user may respond to a prompt on the display device 580 by entering a manual input via the input device 570. In one example, the manual input may be a touch on the touchscreen. In an embodiment, the display device 580 and the input device 570 may be combined into a single device, such as, for example, a touchscreen.

The seller computing device 500 device may also include a feedback device 560. The feedback device 560 may activate in response to a manual input via the input device 570. The feedback device 560 may be a haptic feedback vibration device and/or a speaker emitting a sound. The feedback device 560 may activate to confirm that the manual input entered via the input device 570 was received via the first computer application 550. For example, the feedback device 560 may activate by emitting an audible sound or vibrate the seller computing device 500 to confirm that the manual input entered via the input device 570 was received via the first computer application 550.

The seller computing device 500 may also include a location determination device 590 that may be configured to determine a location of the seller computing device 500 using cellular signal triangulation, a global position satellite (GPS), or any location termination method known to one of skill in the art.

The showing computing device 600 may be a desktop computer, a laptop computer, or a mobile computing device that is typically carried by a person, such as, for example a phone, a smart phone, a PDA, a smart watch, a tablet, a laptop, or any other mobile computing device known to one of skill in the art.

The showing computing device 600 includes a controller 610 configured to control operations of the showing computing device 600. The controller 610 may be an electronic controller including a processor 630 and an associated memory 620 comprising computer-executable instructions (i.e., computer program product) that, when executed by the processor 630, cause the processor 630 to perform various operations. The processor 630 may be, but is not limited to, a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory 620 may be but is not limited to a random access memory (RAM), read only memory (ROM), or other electronic, optical, magnetic or any other computer readable medium.

The showing computing device 600 includes a communication device 640 configured to communicate with the internet 306 through one or more wireless signals. The one or more wireless signals may include Wi-Fi, Bluetooth, Zigbee, Sub-GHz RF Channel, cellular, satellite, or any other wireless signal known to one of skill in the art. Alternatively, the showing computing device 600 may be connected to the internet 306 through a hardwired connection. The showing computing device 600 is configured to communicate with the real-estate showings cloud database 340 through the internet 306.

The showing computing device 600 may include a display device 680, such as for example a computer display, an LCD display, an LED display, an OLED display, a touchscreen of a smart phone, tablet, or any other similar display device known to one of the skill in the art. A user operating the showing computing device 600 is able to view the second computer application 650 through the display device 680.

The showing computing device 600 includes an input device 670 configured to receive a manual input from a user (e.g., human being) of computing device 600. The input device 670 may be a keyboard, a touch screen, a joystick, a knob, a touchpad, one or more physical buttons, a microphone configured to receive a voice command, a camera or sensor configured to receive a gesture command, an inertial measurement unit configured to detect a shake of the showing computing device 600, or any similar input device known to one of skill in the art. The user operating the showing computing device 600 is able to enter data into the second computer application 650 through the input device 670. The input device 670 allows the user operating the showing computing device 600 to data into the second computer application 650 via a manual input to input device 670. For example, the user may respond to a prompt on the display device 680 by entering a manual input via the input device 670. In one example, the manual input may be a touch on the touchscreen. In an embodiment, the display device 680 and the input device 670 may be combined into a single device, such as, for example, a touchscreen.

The showing computing device 600 device may also include a feedback device 660. The feedback device 660 may activate in response to a manual input via the input device 670. The feedback device 660 may be a haptic feedback vibration device and/or a speaker emitting a sound. The feedback device 660 may activate to confirm that the manual input entered via the input device 670 was received via the second computer application 650. For example, the feedback device 660 may activate by emitting an audible sound or vibrate the showing computing device 600 to confirm that the manual input entered via the input device 670 was received via the second computer application 650.

The showing computing device 600 may also include a location determination device 690 that may be configured to determine a location of the showing computing device 600 using cellular signal triangulation, a global position satellite (GPS), or any location termination method known to one of skill in the art.

The seller computing device 500 may belong to or be in possession of a first person 402 that may be a seller/owner of a listed property 410 (i.e., listing) or a listing agent (i.e., seller's agent) of the listed property 410. The listed property 410 is a home/property that has been listed for sale. The showing computing device 600 may belong to or be in possession of a second person 404 that may be a potential buyer of the listed property 410, a buyer's agent of the potential buyer of the listed property 410, the seller/owner of the listed property 410, the listing agent (i.e., seller's agent) of the listed property 410, or a non-member agent tasked to show the listed property 410.

While the first person 402 and the second person 404 are typically different people there may be certain instances where the first person 402 and the second person 404 may be the same person. For example, in the case of a listed property 410 that is a "for sale" by owner the seller/owner of the listed property 410 may be both the first person 402 and the second person 404. In another example, in the case of dual representation of a real-estate agent, the seller's agent may also be the buyer's agent and thus may be both the first person 402 and the second person 404.

Showings of the listed property 410 may be scheduled using the first application 550 and/or the second application 650, then stored in the real-estate showings cloud database 340. Alternatively, the showings may be scheduled using a different website and/or application and may be accessible by the real-estate showings cloud database 340. The showings may each be scheduled with showing information 374, which may include a date and time for the showing of the listed property 410 and also information regarding the second person 404 that will be showing the listed property 410 and the showing computing device 600 that is in possession of the second person 404. This information will allow the showing computing device 600 to be able to unlock the lockbox 200 when necessary. This information will be used by the database 340 to generate credentials that get downloaded to the showing computing device 600 so that the computer application 650 can use those credentials to send over short range wireless to the lockbox 200 to unlock the lockbox 200. Alternatively, the computer application 650 can collect the user intent to open based on GPS location and send a signal to the database 340 to open the lockbox 600 at the location.

The listed property 410 may include one or more IoT connected devices 420. The IoT connected device 420 may include but are not limited to a heating, ventilation, and air conditioning (HVAC) system 420a, an air refresher 420b, a smart kitchen item 420c, smart lights 420d, and a smart lock 420e. Each of the IoT connected devices 420 are smart devices capable of connecting to the internet 306 through either Wi-Fi, Bluetooth, satellite, cellular, a home automation system, or any other connection method.

The first person 402 may enter authorization information 374 and showing settings 376 into the first computer application 550 for each IoT connected device 420 that the first person 402 wants to be controlled for a showing.

The authorization information 374 may include credentials, usernames, passcodes, serial number, item identifiers, or any other information needed to control the IoT connected device 420. The showing settings 376 may be how the IoT connected device 420 should be operated during the showing of the listed property 410. The showing settings 376 may set the ambience for the house so that it shows as best as possible for the buyer. For example, the showing settings 376 may be a temperature setting for the HVAC system 420a, purity or smell levels for the air refreshers 420b, a brightness or on/off for smart lights 420d, or an unlock/lock command for the smart lock 420e.

The showing setting 376 will also include a time setting 378 for when each showing setting 376 is to be implemented. The time setting 378 may be before the showing of the listed property 410, during the showing of the listed property 410, after the showing of the listed property 410, or when the showing computing device 600 is within a prescribed distance from an IoT connected device 420. For example, the smart lights 420d may turn on when the second person 404 with the showing computing device 600 gets to the listed property 410 or when they enter a specific room of the listed property 410. Further, the smart lights 420d may turn off when the second person 404 with the showing computing device 600 is outside of a selected radius 412 around the listed property 410 or when they leave a specific room of the listed property 410. Once the second person 404 is outside of the selected radius 412 around the listed property 410 it may be indicative that they are leaving the listed property 410 because the showing is over and not merely walking around the outside of the listed property 410. Thus, the selected radius 412 may encompass some if not all of the land of the listed property 410 and may even stretch a selected distance outside of the land associated with the listed property 410.

In another example, the smart lock 420e may be located on a room in the listed property 410 that the seller does not want the buyer to enter during a showing. This room may be a junk room. The showing setting 376 and the time setting 378 may dictate that the smart lock 420e is locked for showings of the listed property 410 and then unlocked after the showing of the listed property 410 has ended.

The smart lock 420e may be configured to transmit a note to the showing computing device 600 to indicate that the smart lock 420e is locked, such as, for example, "dog locked in bedroom" or "don't go in there".

The smart lock 420e includes a controller 730 that is configured to communicate with the first application 550, the second application 650, the real-estate showings cloud database 340, and the lockbox 200. The controller 730 may be an electronic controller including a processor 732 and an associated memory 734 comprising computer-executable instructions (i.e., computer program product) that, when executed by the processor 732, cause the processor 732 to perform various operations. The processor 732 may be, but is not limited to, a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory 734 may be but is not limited to a random access memory (RAM), read only memory (ROM), or other electronic, optical, magnetic or any other computer readable medium.

The controller 730 also includes a communication device 736. The communication device 736 may be capable of wireless communication including but not limited to Wi-Fi, Bluetooth, Zigbee, Sub-GHz RF Channel, cellular, satellite, NFC, UWB, LoRA, or any other wireless signal known to one of skill in the art. The communication device 736 may be configured to communicate with the real-estate showings cloud database 340 through the internet 706. Alternatively, or additionally, the communication device 736 may be configured to communicate directly with the real-estate showings cloud database 340. The communication device 736 may be configured to communicate with the lockbox 200.

While the smart lock 420e has been described herein as having a controller 730 it is understood that any IoT connected device 420 may have a similar controller.

The authorization information 374, the showing setting 376, and the time setting 378 may be entered into the first application 550 through a manual input via the input device 570 of the seller computing device 500. Once authorization information 374, the showing setting 376, and the time setting 378 is received by the first computer application 550, the first computer application 550 may transmit the authorization information 374, the showing setting 376, and the time setting 378 to the real-estate showings cloud database 340 where it may be grouped with the showing information 372 as showing details 370. Thus, the showing details 370 may include the showing information 372, authorization information 374, the showing setting 376, and the time setting 378. The real-estate showing cloud database 340 may share the showing details 370 with the lockbox 200 and the showing details 370 may be stored in the memory 334 of the lockbox 200. A data collator or internet router 414 may distribute the showing details from the real-estate showing cloud database 340 to the lockbox 20.

The IoT connected device 420 may be commanded to activate at the time setting 378 and showing setting 376 by the lockbox 200, the real-estate showings cloud database 340, or by the second computer application 650. The IoT connected device 420 may be commanded to activate at the time setting 378 and showing setting 376 based on the time of day, the location of the showing computing device 600, and/or the actuation of the lockbox 200.

The lockbox 200 or the seller computing device 600 can be connected make each IoT connected devices 420 during the showing to turn on and off each IoT connected device 420. After verification of the credentials from the showing computing device 600 to unlock the lockbox 200, the lockbox 200 can then begin to operate the IoT connected devices 420. The operation of the IoT connected devices 420 may be based on movements of the showing computing device 600 through the listed property 410.

Alternatively, after verification of the credentials from the showing computing device 600 to unlock the lockbox 200, the lockbox 200 can then trigger an event to showing computing device 600 to start operating the IoT connected devices 420 at the listed property 410 based on a position of showing computing device 600 relative to lockbox 200. If the showing computing device 600 belongs to a buyer, then the buy may have access to controlling each IoT connected device 420 as they walk through the listed property using the computer application 640 of the showing computing device 600. The IoT connected devices 420 may also be controlled virtually by the first person 402.

Alternatively, after verification of the credentials from the showing computing device 600 to unlock the lockbox 200, the lockbox 200 may communicate with other internal smart locks 420e at the listed property 410 to start controlling IoT connected devices 420.

If the time of day says the showing will begin in a few minutes (or other designated period of time), then the IoT connected device 420. For example, the smart lights 420d may turn on at a designated period of time prior to the start of the showing.

In another example, the HVAC system 420 may adjust the temperature in the listed property 410 such that the requested temperature in the showing setting 376 is reached by the time the showing starts.

If the location of the showing computing device 600 indicates that the second person 404 in possession of the showing computing device 600 will arrive at the listed property in a specified period of time then the IoT connected device 420 will be activated to ensure that the showing settings 376 are achieved by that specified period of time. For example, the smart lights 420d may turn on by the specified period of time when the second person will be arriving at the listed property 410. In another example, the HVAC system 420 may adjust the temperature in the listed property 410 such that the requested temperature in the showing setting 376 is reached by the specified period of time when the second person will be arriving at the listed property 410.

Once the showing has ended, the IoT connected devices 420 may adjust on their own, or commanded to adjust from the real-estate showings cloud database 340. The IoT connected devices will adjust their operation based upon the showing settings 376 for after the showing designated in the time setting 378. For example, after the showing, the smart lights 420d may shut off, the HVAC system 420a may adjust the temperature of the listed property 410 for energy savings rather than comfort, and the smart lock 420e may unlock.

Alternatively, once the showing has been completed, the real-estate showings cloud database 340 may push notification to the smart lock 420e or lockbox 200 that will trigger an event to shut off the IoT connected devices 420. The event may be transmitted through the router 414 or directly to the IoT connected devices 420.

The showing will be determined to have ended based on the closing of the lockbox 200, the showing computing device 600 moving outside of a selected radius 412 of the listed property 410, or after an extended period of time.

Figure 4:
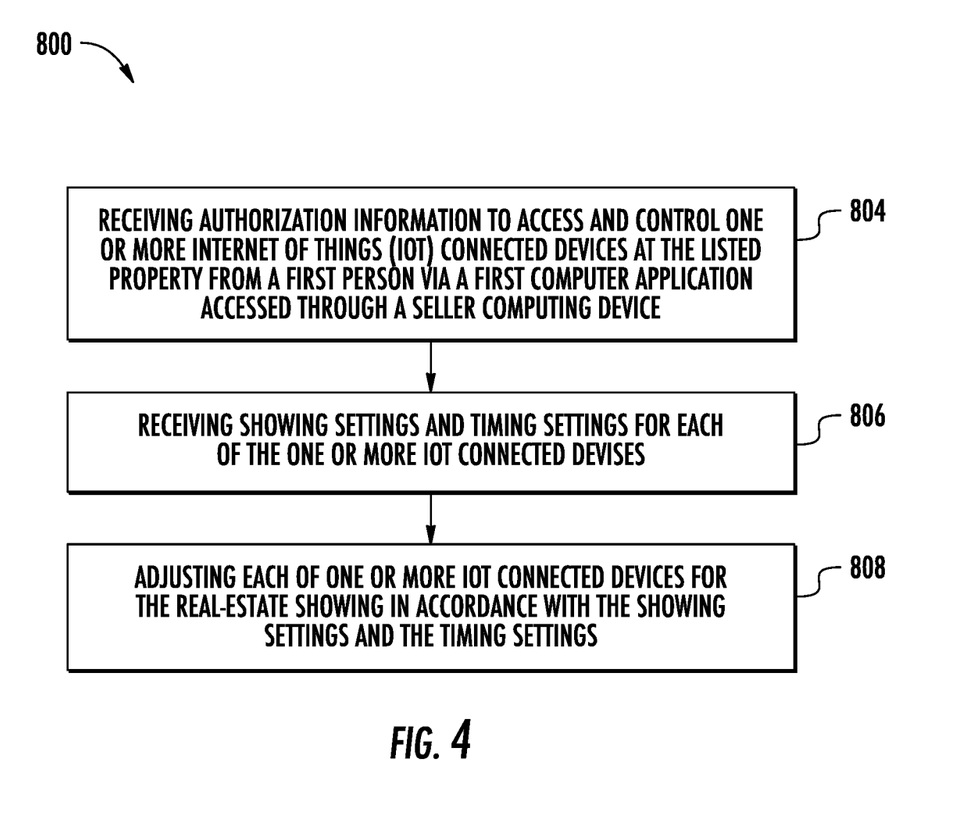
FIG. 4 is a flow process illustrating a method of staging a listed property for a real-estate showing is illustrated, according to an embodiment of the present disclosure.

Referring to FIG. 4, within continued references to FIGS. 1-3, a flow diagram illustrating a method 800 of staging a listed property 410 for a real-estate showing is illustrated, in accordance with an embodiment of the present disclosure.

At block 804, authorization information 374 to access and control one or more IoT connected devices 420 at the listed property 410 is received from a first person 402 via a first computer application 540 accessed through a seller computing device 500.

At block 806, showing settings 376 and timing settings 378 are received for each of the one or more IoT connected devices 420. The showing settings 376 and timing settings 378 may be received from the first person 402 via the first computer application 540 accessed through the seller computing device 500.

At block 808, each of one or more IoT connected devices 420 are adjusted for the real-estate showing in accordance with the showing settings 376 and the timing settings 378. Block 808 may include that a smart lock 420e is locked at the listed property 410 for a duration of the real-estate showing.

Block 808 may include that a smart lock 420e is unlocked at the listed property 410 when the real-estate showing has ended. Block 808 may include that a smart light 420d is turned on at the listed property 410 for the real-estate showing prior to a start time of the real-estate showing. Block 808 may include determining when the real-estate showing has ended and shutting off the smart light 420d when the real-estate showing has ended. Block 808 may include activating an air refresher 420b at the listed property 410 for the real-estate showing prior to a start time of the real-estate showing. Block 808 may include determining when the real-estate showing has ended and shutting off the air refresher 420b when the real-estate showing has ended. Block 808 may include activating a heating, ventilation, and air conditioning (HVAC) system 420a at the listed property 410 for the real-estate showing prior to a start time of the real-estate showing. Block 808 may include determining when the real-estate showing has ended and adjusting the HVAC system 420a for energy savings when the real-estate showing has ended.

The method 800 may further include that a location of a showing computing device 600 that is in possession of a second person 404 assigned to show the listed property 410 to a potential buyer is detected and an arrival time of the second person 404 at the listed property 410 is determined. The location may be detected using GPS or cellular triangulation. At least one of the one or more IoT connected devices 420 is adjusted before the arrival time.

The method 800 may also include determining when the real-estate showing has ended and then readjusting each of one or more the one or more IoT connected devices 420 in accordance with the showing settings 376 and the timing settings 378 when the real-estate showing has ended.

It may be determined that the real-estate showing has ended by detecting when a lockbox 200 has been closed. It may be determined that the real-estate showing has ended by detecting a location of a showing computing device 600 that is in possession of a second person 404 assigned to show the listed property 410 to a potential buyer and detecting when the location of the showing computing device 600 is outside of a selected radius of the listed property 410.

The method may also include that a location of a showing computing device 600 that is in possession of a second person 404 assigned to show the listed property 410 to a potential buyer is detected. At least one of the one or more IoT connected devices 420 adjusts based on the location of the showing computing device 600 at the listed property 410.

While the above description has described the flow process of FIG. 4 in a particular order, it should be appreciated that unless otherwise specifically required in the attached claims that the ordering of the steps may be varied.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method of staging a listed property for a real-estate showing, the method comprising:
   receiving authorization information to access and control one or more internet of things (IoT) connected devices at the listed property from a first person via a first computer application accessed through a seller computing device;
   receiving showing settings and timing settings for each of the one or more IoT connected devices;
   adjusting each of one or more IoT connected devices for the real-estate showing in accordance with the showing settings and the timing settings;
   locking a smart lock at the listed property for a duration of the real-estate showing; and
   unlocking the smart lock at the listed property when the real-estate showing has ended; and
   sending a note to a showing computing device from the smart lock indicating why the smart lock is locked.

2. The method of claim 1, further comprising:
   detecting a location of the showing computing device that is in possession of a second person assigned to show the listed property to a potential buyer; and
   determining an arrival time of the second person at the listed property,
   wherein at least one of the one or more IoT devices is adjusted before the arrival time.

3. The method of claim 1, further comprising:
   determining when the real-estate showing has ended; and
   readjusting each of one or more the one or more IoT connected devices in accordance with the showing settings and the timing settings when the real-estate showing has ended.

4. The method of claim 3, wherein it is determined that the real-estate showing has ended by:
   detecting when a lockbox has been closed.

5. The method of claim 3, wherein it is determined that the real-estate showing has ended by:
   detecting a location of the showing computing device that is in possession of a second person assigned to show the listed property to a potential buyer; and
   detecting when the location of the showing computing device is outside of a selected radius of the listed property.

6. The method of claim 1, further comprising:
   detecting a location of the showing computing device that is in possession of a second person assigned to show the listed property to a potential buyer,
   wherein at least one of the one or more IoT connected devices adjusts based on the location of the showing computing device at the listed property.

7. The method of claim 1, further comprising:
   turning on a smart light at the listed property for the real-estate showing prior to a start time of the real-estate showing.

8. The method of claim 7, further comprising:
   determining when the real-estate showing has ended; and
   shutting off the smart light when the real-estate showing has ended.

9. The method of claim 1, further comprising:
   activating an air refresher at the listed property for the real-estate showing prior to a start time of the real-estate showing.

10. The method of claim 9, further comprising:
    determining when the real-estate showing has ended; and
    shutting off the air refresher when the real-estate showing has ended.

11. The method of claim 1, further comprising:
    activating a heating, ventilation, and air conditioning (HVAC) system at the listed property for the real-estate showing prior to a start time of the real-estate showing.

12. The method of claim 11, further comprising:
    determining when the real-estate showing has ended; and
    adjusting the HVAC system for energy savings when the real-estate showing has ended.

13. A computer program product tangibly embodied on a non-transitory computer readable medium, the computer program product including instructions that, when executed by a processor, cause the processor to perform operations comprising:
    receiving authorization information to access and control one or more internet of things (IoT) connected devices at the listed property from a first person via a first computer application accessed through a seller computing device;
    receiving showing settings and timing settings for each of the one or more IoT connected devices;
    adjusting each of one or more IoT connected devices for the real-estate showing in accordance with the showing settings and the timing settings;
    locking a smart lock at the listed property for a duration of the real-estate showing; and
    unlocking the smart lock at the listed property when the real-estate showing has ended; and
    sending a note to a showing computing device from the smart lock indicating why the smart lock is locked.

14. The computer program product of claim 13, wherein the operations further comprises:
    detecting a location of the showing computing device that is in possession of a second person assigned to show the listed property to a potential buyer; and
    determining an arrival time of the second person at the listed property,
    wherein at least one of the one or more IoT devices is adjusted before the arrival time.

15. The computer program product of claim 13, wherein the operations further comprises:
    determining when the real-estate showing has ended; and
    readjusting each of one or more the one or more IoT connected devices for in accordance with the showing settings and the timing settings when the real-estate showing has ended.

* * * * *